United States Patent
Nain

Patent Number: 5,978,866
Date of Patent: Nov. 2, 1999

[54] DISTRIBUTED PRE-FETCH BUFFER FOR MULTIPLE DMA CHANNEL DEVICE

[75] Inventor: Yueh-Yao Nain, Hsin-Chu, Taiwan

[73] Assignee: Integrated Technology Express, Inc., Hsinchu-chu, Taiwan

[21] Appl. No.: 08/857,934

[22] Filed: May 16, 1997

Related U.S. Application Data

[60] Provisional application No. 60/040,105, Mar. 10, 1997.

[51] Int. Cl.$^6$ .................................................... G06F 13/00
[52] U.S. Cl. ................................ 710/22; 710/24; 710/28; 710/44
[58] Field of Search ...................................... 395/842, 844, 395/848, 864, 425, 309; 710/22, 24, 28, 44; 369/93

[56] References Cited

U.S. PATENT DOCUMENTS

| | | | |
|---|---|---|---|
| 4,528,626 | 7/1985 | Dean et al. | 364/200 |
| 4,987,529 | 1/1991 | Craft et al. | 364/200 |
| 5,251,307 | 10/1993 | Sugiyama | 395/846 |
| 5,438,665 | 8/1995 | Taninai et al. | 395/845 |
| 5,450,551 | 9/1995 | Amini et al. | 395/299 |
| 5,581,530 | 12/1996 | Lizuka et al. | 369/93 |
| 5,655,151 | 8/1997 | Bowes et al. | 395/842 |
| 5,774,684 | 6/1998 | Haines et al. | 395/309 |

*Primary Examiner*—Thomas C. Lee
*Assistant Examiner*—Mohamed Mashaal
*Attorney, Agent, or Firm*—Rabin & Champagne, P.C.

[57] ABSTRACT

Higher speed data transactions between a host computer's system memory and a plurality of slow peripheral devices are accomplished by providing distributed DMA functions along with distributed pre-fetch buffers. The first I/O device accesses the host bus via a first DMA channel and a first pre-fetch buffer, the second I/O device accesses the host bus via a second DMA channel and a second pre-fetch buffer, and the third I/O device accesses the host bus via a third DMA channel and a third pre-fetch buffer. In a first DMA transaction, the first pre-fetch buffer is filled with data being transferred between the first I/O device and the host system memory. While the data are transferred between the pre-fetch buffer and either the first I/O device or the system memory, the second pre-fetch buffer is being filled pursuant to a second DMA transaction between the second I/O device and the system memory. This strategy increases the speed of successive DMA transactions between a plurality of I/O devices and the host computer system's memory.

11 Claims, 3 Drawing Sheets

FIG. 1 - Prior Art

DISTRIBUTED PRE-FETCH BUFFER FOR MULTIPLE DMA CHANNEL DEVICE

This application claims priority from provisional application Ser. No. 60/040,105, filed Mar. 10, 1997.

BACKGROUND OF THE INVENTION.

1. Field of the Invention.

The present invention relates to the transfer of data within a computer system from a relatively slow peripheral I/O device through a high speed data bus to a system memory.

2. Description of the Related Art.

Typical small computer systems incorporate a microprocessor, various kinds of memory, one or more buses, and a number of devices that transfer data over the buses between themselves, the memory and the microprocessor. A common configuration of computer system provides a central processing unit (CPU) such as a microprocessor coupled to a cache or other local memory and to a memory controller by a local processor bus. The memory controller is connected to the system memory over a memory bus and provides controlled access to the system memory for the microprocessor as well as for other devices in the computer system over the system bus of the computer system. Frequently, data communications between the microprocessor and other devices within the computer system are mediated by the system memory, so that the transfer of data from the various devices to the system memory is an important aspect of the operation of small computer systems. Data transfers between the system memory and other devices of the computer require that the system bus arbiter recognize the device request for a memory transaction and cause the microprocessor to relinquish control of the bus to the device for the memory transaction. The system bus may have different configurations, but is typically a high speed, synchronous bus having a configuration and architecture like that of the peripheral component interface (PCI) bus. A particular implementation of such a small computer system having a PCI bus and which illustrates a variety of conventional aspects of data transfers, including bus control and arbitration, is described in U.S. Pat. No. 5,450,551 to Amini, et al., which is hereby incorporated by reference.

The PCI bus architecture places significant restrictions on the types of devices that can couple to the bus. Devices connected to the PCI bus generally should be, for example, thirty-two bit devices that have bus mastering capabilities. Examples of such devices include Winchester-type hard disk drives and graphics controllers. Such bus mastering devices include internally the registers and logic required for performing direct memory access (DMA) and so need not rely on the bus mastering capabilities of a system DMA. Present day small computer systems also incorporate comparatively slow peripheral I/O devices that must perform transactions with the memory but which cannot be directly interfaced to the PCI or other system bus of the computer system. These PCI incompatible devices operate at slower data rates than the PCI bus and do not have the bus mastering capabilities required for direct connection to the PCI bus. Examples of PCI incompatible devices include controllers for floppy disk drives as well as other I/O devices like parallel ports and infrared data ports.

It has generally been necessary to provide a separate I/O bus, such as an ISA bus, in addition to the PCI bus within the computer system to be shared by the lower speed I/O devices that cannot directly couple to the PCI bus. The devices coupled to the ISA bus are separated from the system PCI bus by a bus bridge, which preferably includes a DMA controller to control the memory I/O (storage and reading) transactions between the devices connected to the ISA bus and the system memory over the PCI bus. A conventional configuration of a DMA system for coupling peripheral I/O devices on an ISA bus to a PCI system bus is shown in FIG. 1. Various peripheral I/O devices, collectively indicated by 10 in FIG. 1, are coupled to the ISA bus 20 via a standard bus bridge 30 to the PCI system bus 40. The peripheral I/O devices may include, for example, a floppy disk controller 12, a parallel port controller 14 and an infrared port controller 16. Other peripheral devices might also be provided. Access to the shared ISA bus 20 by the various peripheral I/O devices 10 is controlled by the DMA controller 32, which is provided along with a buffer memory 34 on the standard I/O bridge 30 coupled between the ISA bus 20 and PCI bus 40. Conventionally, the DMA controller includes both the logic for arbitrating requests for bus access as well as the logic for communicating control signals for the bus transactions to the peripheral I/O devices.

Typically, the DMA controller 32 on the bridge 30 is of the 8237 type and includes eight thirty-two bit channels for transferring data. When one of the I/O devices 10 wishes to gain access through the PCI bus 40 to the system memory, or otherwise to access the PCI bus 40, the I/O device 10 issues a DMA request (DREQ) to the DMA controller 32. The DMA controller 32 issues a request to the PCI bus arbiter for bus access. When the DMA controller 32 is granted control of the bus, the DMA controller 32 signals (DACK) the appropriate I/O device 10 and initiates a transfer of data from the I/O device 10 through the ISA bus 20 and through the bridge 30 to the PCI bus 40. The PCI bus provides the data to its destination, for example, to a memory controller for storage in the system memory or to another device connected to the PCI bus 40 (neither shown).

The particular order of transactions described here may proceed in a slightly different manner to accommodate both the slow nature of the I/O devices 10, and also to accommodate the very different speeds and protocols on the ISA bus 20 and the PCI bus 40. Often, a buffer memory 34 is provided on the bridge to temporarily store the data that is being transferred from the PCI bus 40 to the I/O devices 10 and also to temporarily store the data that is being transferred from the active one of the I/O devices 10 over the ISA bus 20, through the bridge 30 and onto the PCI bus 40. Thus, the buffer memory 34 may be filled, under the direction of the DMA controller 32, during a data transfer operation from the system memory over the PCI bus 40 to the target one of the I/O devices 10. This is due to the PCI bus providing data to the buffer memory 34 at a much faster rate than the data can be transferred from the buffer 34 over the ISA bus 20 to the I/O devices 10.

For the transfer of data from the system bus to the peripheral I/O device, the simple description of DMA control set forth above may be practiced without reducing the performance of the computer system. The transfer of data from the I/O device 10 to the system memory over the PCI bus 40, however, can be further optimized from the basic DMA control sequence describe above to improve the performance of the computer system. In particular, the order of control signals might be varied from the described ordering of operations, or at least some delays might be inserted between some operations, to provide better system performance. To this end, the peripheral I/O device 10 might issue a DMA request to the DMA controller 32, which might not immediately issue a request for bus control. It might instead be preferred for the DMA controller to delay issuing a request for the bus until after the I/O device has transferred to the buffer memory 34 all of the data to be transferred, or at least a sufficient quantity of data to fill the buffer memory, before the DMA controller 32 issues a request to the PCI bus arbiter for bus control. This strategy will reduce the amount of time dedicated by the PCI bus to waiting for data from the I/O device. Thus, one function of the bridge in the FIG. 1 system is to provide improved device performance by providing a buffer to equilibrate the speeds of the PCI and ISA buses. Another function of the bridge 30 is to accommodate and translate between the different protocols and timings of the PCI and ISA buses.

The transfer of data between the system memory and slow peripheral I/O devices is a source of performance and reliability problems in small computer systems, since most of the computer system operates at a much higher data rate than these peripheral devices. The architecture described above places all of the peripheral I/O devices on a shared data bus and conducts DMA operations completely and in sequence. This means that peripheral I/O devices that have comparatively high data transfer rates occasionally will be queued behind slower peripheral I/O devices awaiting a DMA transaction, substantially negating the advantage of the higher data transfer rates. It would is desirable to provide a system in which higher speed peripheral I/O devices can better avoid delays caused by DMA transactions involving slower peripheral I/O devices. Conventional methods of interfacing slow peripheral I/O devices to the host computer system are further undesirable as requiring space on the system motherboard to provide a generally incompatible and obsolete shared I/O bus.

SUMMARY OF THE PREFERRED EMBODIMENTS

It is an object of the present invention to provide a architecture and method of transferring data between the memory a host computer system and a plurality of I/O devices that reduces delays in the transfer of data between the memory of the host computer system and the I/O devices. It is another object of the present invention to provide a more distributed scheme for allowing slow I/O devices to gain access to the system memory of a computer system.

One aspect of the present invention provides a method of transferring data between a plurality of I/O devices and a host computer system having a system memory and a host data bus. A first peripheral I/O device controller is associated with a first DMA channel and a first pre-fetch buffer and a second peripheral I/O device controller is associated with a second DMA channel and a second pre-fetch buffer. A first DMA operation is performed on behalf of the first peripheral I/O device controller in response to a first DMA request issued by the first DMA channel, with first data being transferred from the system memory over the host data bus to the first pre-fetch buffer in response to the first DMA request. A second DMA operation is performed on behalf of the second peripheral I/O device controller in response to a second DMA request issued by the second DMA channel. First data are transferred from the first pre-fetch buffer to the first peripheral I/O device controller while second data are transferred from the system memory over the host data bus and stored in the second pre-fetch buffer in response to the second DMA request.

Another aspect of the present invention provides a method of transferring data between a plurality of I/O devices and a host computer system having a system memory and a host data bus. A plurality of peripheral I/O device controllers are provided and associated with a plurality of single DMA channels with individual ones of the peripheral I/O device controllers. A memory is partitioned to define a plurality of single channel pre-fetch buffers corresponding to the plurality of peripheral I/O device controllers. Each of the partitions within the memory is accessible by a single one of the plurality of peripheral I/O device controllers in response to a DMA request issued by a corresponding one of the single DMA channels. A first DMA operation is performed on behalf of a first peripheral I/O device controller in response to a first DMA request issued by a first DMA channel, first data being transferred from the system memory over the host data bus to a first pre-fetch buffer in response to the first DMA request. A second DMA operation is performed on behalf of a second peripheral I/O device controller in response to a second DMA request issued by a second DMA channel, second data being transferred from the system memory over the host data bus and stored in the second pre-fetch buffer in response to the second DMA request.

DETAILED DESCRIPTION OF THE PREFERRED EMBODIMENTS

Conventional configurations of multiple DMA channel devices utilize a single port connecting the I/O devices to the system bus and incorporating a single, common pre-fetch buffer. A drawback to this configuration is that the multiple DMA channels cannot operate concurrently; only one of the DMA channels can operate at one time. Sharing the common pre-fetch buffer downgrades the total performance of the computer system, as higher speed peripheral I/O devices are forced to wait for bus access behind slower peripheral I/O devices like floppy disk controllers. Preferred embodiments of the present invention provide distributed DMA control including distributed pre-fetch buffers. In one embodiment, a first, single channel DMA function and a first pre-fetch buffer are associated with a first I/O device and a second, single channel DMA function and a second pre-fetch buffer are associated with a second I/O device. The two DMA channels and pre-fetch buffers may operate independently so that parts of two or more different DMA transactions may be ongoing simultaneously. In transferring data between the host computer system memory and the first and second I/O devices, it is possible to store data into the first pre-fetch buffer corresponding to a first DMA operation between the first I/O device and the system memory. While the data is being transferred between the first pre-fetch buffer and either the first I/O device or the system memory, data corresponding to a second DMA operation between the second I/O device and the system memory can be stored into the second pre-fetch buffer at the same time. This strategy speeds a sequence of DMA operations between the various peripheral I/O devices, transferring data between the system memory and the various devices with less overall delay.

Figure 1:
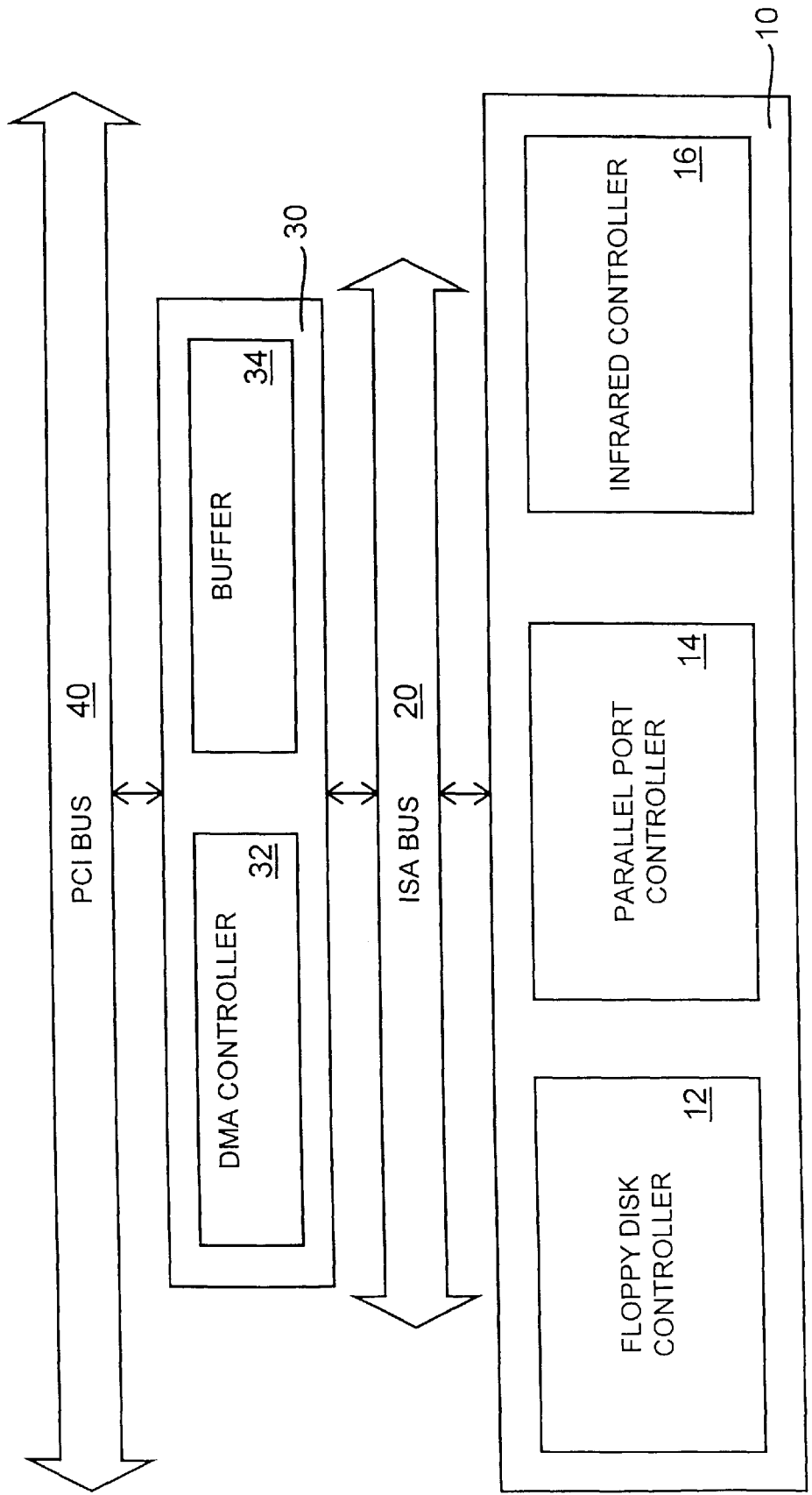
FIG. 1 illustrates an I/O bus, a DMA bridge and a system bus as found in a conventional computer system.
Figure 2:
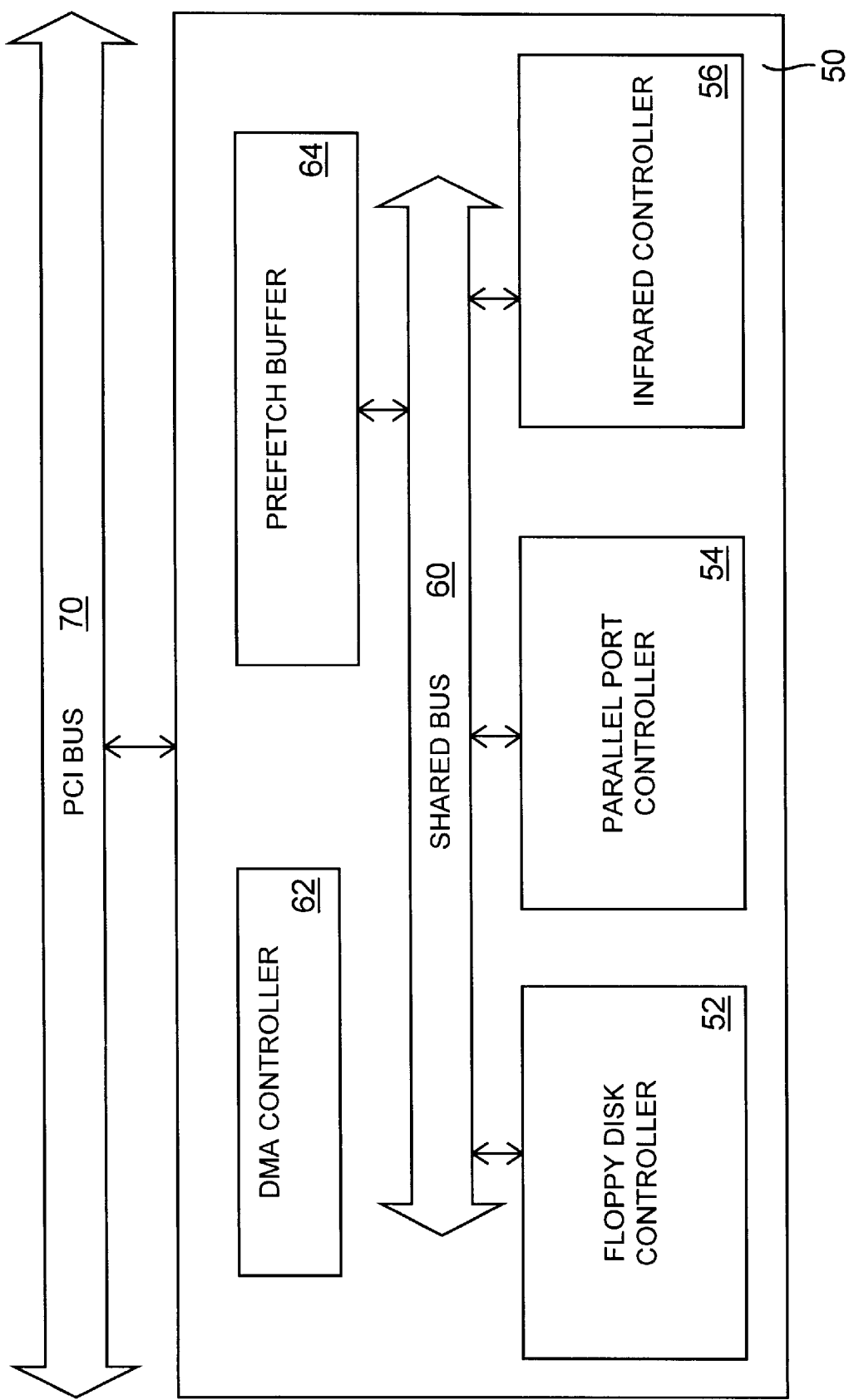
FIG. 2 illustrates a configuration of a distributed DMA mechanism between I/O devices and the system bus of a computer system.

Conventional computer systems provide an I/O bus such as an ISA bus to accommodate peripheral I/O devices that do not incorporate bus mastering capabilities and which operate at speeds significantly slower than are characteristic of system buses such as the PCI bus. Although it is important for the computer system to incorporate these peripheral I/O devices, it is preferable to accommodate these devices without providing an ISA bus on the motherboard of the small computer system. One strategy for removing the ISA bus from the motherboard is illustrated in FIG. 2. In this system, a single device 50 is provided that directly interfaces with the system bus and includes a plurality of I/O controllers such as a floppy disk controller 52, a parallel port controller 54 and an infrared controller 56. The various peripheral I/O devices 52, 54 and 56 are connected to a shared bus 60 and through the shared bus 60 to a DMA controller 62 and a pre-fetch buffer 64, which are in turn connected to the system (PCI) bus 70. This configuration is in many ways similar to the DMA facilities of early personal computers, but with the DMA controller and the controllers for a variety of peripheral I/O devices incorporated on a single device 50. Access to the pre-fetch buffer, and thereby to the PCI bus, is provided over the shared bus 60 under the control of the DMA controller 62. The unified controller 50 might be implemented on a single daughter board in which much of the circuitry is provided on one or a few chips, with the daughterboard incorporating a number of terminals for connecting to the peripheral I/O devices. In other instances, all of the functions of the unified controller 50 might be accommodated on a single integrated circuit that might be mounted on the motherboard, with the appropriate terminals for physically connecting the peripheral devices to their controllers provided elsewhere.

A primary advantage of the device illustrated in FIG. 2 is that the various I/O controllers are closely associated with the DMA controller 62 and pre-fetch buffer that are directly connected to the PCI or other system bus 70. As in most DMA systems, the DMA controller can be viewed as providing a level of distribution in the DMA functions. That is, the DMA controller 62 includes, for example, eight DMA channels which can separately receive and queue a DMA request for a different peripheral I/O device. Each of the DMA channels stores the data essential to facilitating the DMA transaction such as starting memory location and the length of the memory block to be transferred, and is identified by a priority for the associated device's DMA request. However, while the device of FIG. 2 does provide some distributed DMA functions, the device 50 incorporates a single pre-fetch buffer for facilitating transactions between the PCI bus 70 and the shared data bus 60. The single pre-fetch buffer 64 can act as a bottleneck on DMA transactions between the various I/O devices coupled to the shared data bus and the host system bus.

The constricting nature of the single pre-fetch buffer configuration of the FIG. 2 device can be illustrated as follows. Consider that a data file is being saved to a floppy disk controlled by a floppy disk controller 52 at the same time that the file is being printed to a graphics printer controlled by the parallel port controller 54. In one DMA transaction, the floppy disk controller 52 requests data to be written to the floppy disk drive and the requested thirty-two bytes of data is read from the host system memory and stored in the pre-fetch buffer 64. Due to the slow nature of the floppy disk controller's operations, the pre-fetch buffer 64 will be committed to this transfer of data through the floppy disk controller for a relatively long time. During this time, the printer requires additional data, so the parallel port controller issues a DMA request to the DMA controller 62. This request cannot yet be issued to the host system bus, because the pre-fetch buffer is not ready to receive the requested data. Thus, the DMA controller merely stores the characteristics of the DMA request and schedules the request for a later time when the pre-fetch buffer is available. Thus, the comparatively fast parallel port controller 54 can starve for additional data while waiting for the floppy disk controller 52 to consume the data in the pre-fetch buffer 64 before freeing the pre-fetch buffer for additional DMA transactions. Reducing the delay between successive DMA transactions for peripheral I/O devices could therefore improve system performance.

Figure 3:
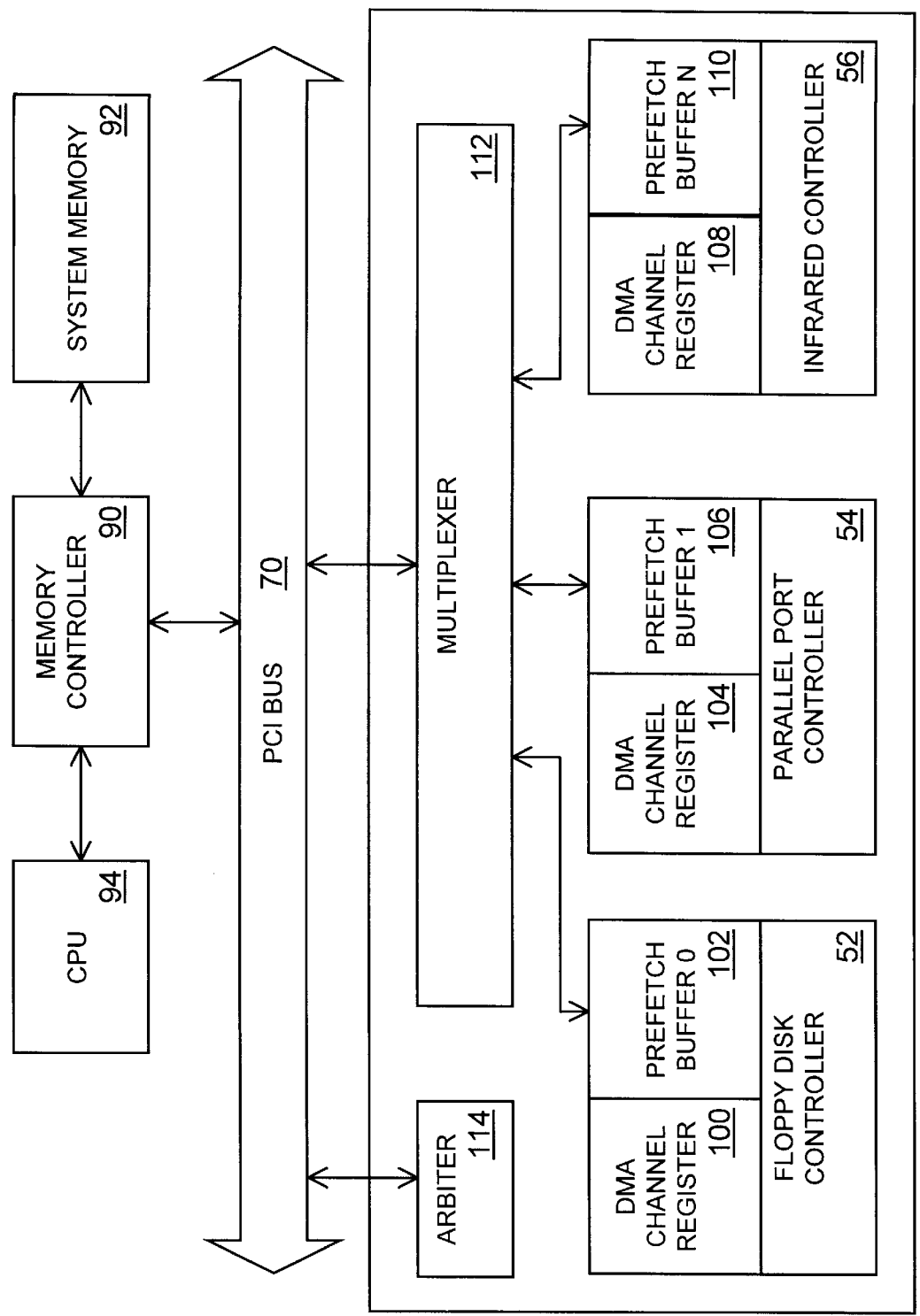
FIG. 3 illustrates a particularly preferred configuration of an interface between I/O devices and the system bus of a computer system incorporating both distributed DMA and distributed pre-fetch buffers.

FIG. 3 illustrates a particularly preferred embodiment of the present invention which provides distributed pre-fetch buffers, preferably providing a separate, single channel pre-fetch buffer for each of the DMA channels that can be accommodated by the unified peripheral controller 80 shown in FIG. 3. Consequently, the present invention provides a plurality of independent DMA channels with independent pre-fetch buffers. The independent pre-fetch buffers may constitute different physical memories, or may represent logical partitions within a larger buffer memory. Generally, the pre-fetch buffer will be a multiport RAM or a FIFO having logical partitions to indicate the separate pre-fetch buffers. The particular size of the pre-fetch buffers will generally be determined by the particular demands of the peripheral I/O devices, and can be set by fixing logical partitions within a larger memory that is dedicated to the different pre-fetch buffers. Depending upon the particular configuration of the unified peripheral controller 80, the individual pre-fetch buffers may be connected to the various peripheral controllers over a shared bus. This configuration is in most instances simple to implement.

In other embodiments of the invention, each of the pre-fetch buffers is connected directly to the peripheral I/O controller assigned to that DMA channel. Physically, this means that different ports of the buffer memory will be assigned to different ones of the pre-fetch buffers associated with the different DMA channels. It is entirely possible and in some instances desirable for the unified peripheral controller 80 to be physically configured as shown in FIG. 3. Often, however, it will be more economical to provide the various (e.g., eight) channels of DMA control in a single 8237-like DMA controller and to provide the various (e.g., eight) pre-fetch buffers in a single memory device having multiple outputs that can be committed to a fixed output connection or that can be switched between the different output channels associated with the peripheral I/O controllers assigned to the different DMA channels. The memory device may thus include one or more memory chips and have means, whether internal to the memory chip or otherwise, for providing distinct outputs to the different DMA channels. Dedicated (e.g., direct) connections between the memory device and the peripheral I/O controllers provides the most completely distributed and independent DMA functions for the illustrated system. On the other hand, significant improvements in DMA transactions between peripheral I/O controllers and host system memory can be obtained in the more typical configurations of the present invention in which communications between the memory device and the peripheral I/O controllers.

Referring now to FIG. 3, a unified peripheral controller 80 is connected to PCI bus 70 of a host computer system and through the PCI bus 70, and through possible intermediate buses and interfaces, to the system memory controller 90. The system memory controller 90 controls access to the system memory 92 and provides one data path to the system CPU or microprocessor 94. Most preferably, each of the peripheral I/O device controllers 52, 54, 56 provided within the unified controller 80 has a logically dedicated DMA channel register 100, 104, 108 and a logically dedicated pre-fetch buffer 102, 106, 110. The DMA channel registers each store the data characteristic of the DMA request made by the peripheral I/O device connected to that DMA channel. The different pre-fetch buffers are connected to the PCI bus 70 through a multiplexer or other switch 112. The multiplexer 112 is controlled to direct the data from the PCI bus 70 to the peripheral I/O device that made the most recent DMA request, or to direct data from a selected one of the peripheral I/O devices to the PCI bus 70 for eventual transfer to the system memory 92. The unified peripheral controller 80 also includes arbiter 114 which performs the same functions as the arbiter within a conventional 8237 DMA controller, determining priority for DMA requests from the peripheral devices 52, 54, 56 and transmitting DMA requests to the PCI bus arbiter.

The functions and particular advantages of the FIG. 3 system can be appreciated by revisiting the example previously discussed with respect to the FIG. 2 configuration of a unified peripheral controller. Once again, a data file is being written to the floppy disk drive of a computer system at the same time that the data file is being printed. The floppy disk drive is controlled by the comparatively slow floppy disk controller 52 and the printer is controlled by the comparatively fast parallel port controller 54. In one DMA transaction, the floppy disk controller 52 requests through DMA channel register 100 and arbiter 114 for data to be written to the floppy disk drive and the requested thirty-two bytes of data is read from the host system memory 92 and stored in the pre-fetch buffer 102. Due to the slow nature of the floppy disk controller's operations, the pre-fetch buffer 102 will be committed to this transfer of data through the floppy disk controller for a relatively long time. While the data are being transferred from the pre-fetch buffer 102 through the floppy disk controller 52 to the floppy disk drive, the printer requires additional data. The parallel port controller 54 issues a DMA request through its DMA channel register 104 and the arbiter 114 to the PCI bus arbiter. Unlike the earlier example, this DMA can immediately be issued to the PCI system bus 70, because the pre-fetch buffer 106 dedicated to the parallel port controller 54 is always ready to receive data requested by the parallel port controller's DMA channel register 104. When the second DMA request is issued, the multiplexer 112 is switched so that the next data provided to the unified controller 80 by the PCI bus 70 will be directed to the pre-fetch buffer 106 associated with the parallel port controller. In those embodiments of the FIG. 3 system in which the memory device is coupled to the peripheral I/O devices 52, 54, 56 over a shared bus, the data requested by the parallel port controller are held in the pre-fetch buffer until the shared bus becomes available. Even though the data are not immediately provided to the parallel port controller 54, a necessary portion of the DMA operation is performed while the floppy disk controller 52 is still performing the previous DMA transaction. In other embodiments in which there are no conflicts between simultaneously transferring data between two different pre-fetch buffers and two different peripheral I/O devices, the pre-fetch buffer 106 can begin transferring data to the parallel port controller 54 immediately upon assembly of the data. In either case, a significant reduction in the delay between successive DMA transactions between the peripheral I/O devices 52, 54, 56 and the host system memory 92 can be achieved through practice of the device illustrated in FIG. 3.

While the present invention has been described as it relates to a specific high speed synchronous bus, specifically the PCI bus, the present invention might be utilized in conjunction with other bus architectures including high speed asynchronous bus architectures. In addition, while the preceding discussion has been made in terms of a singular system bus connecting a memory controller to the various bus mastering devices of the computer system along with the DMA controller for the peripheral I/O devices, it is to be understood that there may be more than one distinct bus along this data path. Since the described aspects of the present invention are consistent with the presence of multiple and/or segmented buses along the data path, no discussion of these alternate embodiments is provided herein. It will, of course, be understood that such alternate embodiments fall within the scope and teachings of the present invention.

In the interest of making the preceding discussion concise and specific to the present invention, certain aspects of the environment of the invention and its operation have not been described. These aspects of the present invention will be understood by those of ordinary skill in the art, but further references are provided herein that may be referenced for specific details of interest to some readers. All of the DMA devices described herein may be of the 8237 type and provide a total of eight DMA channels each identified by number of internal registers. For example, the DMA controller may also include registers that identify the address of the data to be transferred for each DMA channel and registers that identify the total number of bytes to be transferred for each DMA channel. The internal registers, address lines, data lines and control lines (e.g., DREQ, DACK), other aspects of the architecture, configuration, control and operation of eight DMA channels, consisting of two four channel Intel 8237 DMA devices, is described in U.S. Pat. No. 4,528,626 to Dean, et al., which is hereby incorporated by reference. As in any DMA system, the interaction between the microprocessor and the DMA, together with the assertion and release of bus control is notable.

U.S. Pat. No. 4,987,529 to Craft, et al., provides a description of the cooperation and communication between a DMA controller and a floppy disk drive controller, and this aspect of the Craft patent is hereby incorporated by reference. U.S. Pat. No. 4,987,529 also describes a shared bus system including different bus mastering devices, system memory, a microprocessor, and a DMA device and also describes the interactions of these devices with a bus arbitration controller. While this bus arbitration system is not necessarily the one used in preferred aspects of the present invention, the actual devices used in accordance with the present invention may be very similar. These aspects of the Craft patent are also incorporated by reference.

The present invention has been described with reference to certain particularly preferred embodiments thereof. Those of ordinary skill in the art will appreciate that a number of modifications and variations might be made on the particular embodiments described herein without varying from the basic teachings of the present invention. For example, the logical partitioning of the memory device might be performed in a dynamic manner, with pre-fetch buffers being assigned to accommodate each successive DMA request. Accordingly, the present invention is not to be limited to any particular embodiment described herein. Rather, the scope of the present invention is to be determined from the claims which follow.

What is claimed:

1. A method of transferring data between a host computer system and a plurality of I/O devices, the method comprising the steps of:
   providing a host computer system having a system memory and a host data bus;
   providing a first peripheral I/O device controller, a first DMA channel and a first pre-fetch buffer, wherein the first DMA channel and the first pre-fetch buffer are dedicated to the first peripheral I/O device controller;
   providing a second peripheral I/O device controller, a second DMA channel and a second pre-fetch buffer, wherein the second DMA channel and the second pre-fetch buffer are dedicated to the second peripheral I/O device controller;
   performing a first DMA operation on behalf of the first peripheral I/O device controller in response to a first DMA request issued by the first DMA channel, first data being transferred from the system memory over the host data bus to the first pre-fetch buffer, and in response to the first DMA request;
   performing a second DMA operation on behalf of the second peripheral I/O device controller in response to a second DMA request issued by the second DMA channel; and
   transferring the first data from the first pre-fetch buffer directly to the first peripheral I/O device controller by a first dedicated connection while second data are transferred from the system memory over the host data bus and stored in the second pre-fetch buffer in response to the second DMA request.

2. The method of claim 1, wherein the first and second DMA channels are different channels within a single DMA controller.

3. The method of claim 2, wherein the first and second pre-fetch buffers represent logically distinct regions within a buffer memory device.

4. The method of claim 3, wherein the buffer memory device is a multiport memory device, with different ports of the buffer memory device associated with different ones of the logical partitions within the buffer memory device.

5. The method of claim 4, wherein a first port and a second port of the different ports of the buffer memory device are directly coupled by further dedicated connections to the first and the second peripheral I/O devices, respectively.

6. The method of claim 1, wherein the first peripheral I/O device is a floppy disk controller and the second peripheral I/O device is a parallel port controller.

7. The method of claim 6, further comprising the steps of:
   providing a third peripheral I/O device controller directly coupled to a third DMA channel and a third pre-fetch buffer with the third peripheral I/O device; and
   performing a third DMA operation on behalf of the third peripheral I/O device controller in response to a third DMA request issued by the third DMA channel, third data being transferred from the system memory over the host data bus to the third pre-fetch buffer in response to the third DMA request.

8. The method of claim 1, wherein the first and second pre-fetch buffers are coupled to the host data bus through a multiplexer, which selectively couples the host data bus to the first and second pre-fetch buffers in response to the first and second DMA requests, respectively.

9. A method of transferring data between a host computer and a plurality of I/O devices, the method comprising the steps of:
   providing a host computer system having a system memory and a host data bus;
   providing a plurality of peripheral I/O device controllers, each of which is directly coupled to a respective dedicated one of a plurality of single DMA channels and a respective dedicated one of a plurality of single pre-fetch buffers;
   performing a first DMA operation on behalf of a first one of the peripheral I/O device controllers in response to a first DMA request issued by the respective DMA channel dedicated thereto, first data being transferred between the system memory over the host data bus and the first peripheral I/O device by a dedicated connection between the first peripheral I/O device and the respective pre-fetch buffer dedicated thereto, in response to the first DMA request; and
   performing a second DMA operation on behalf of a second one of the peripheral I/O device controllers in response to a second DMA request issued by the respective DMA channel dedicated thereto, second data being transferred between the system memory over the host data bus and the second peripheral I/O device controller by further dedicated connection, in response to the second DMA request.

10. A multiple DMA channel device for transferring data between a system memory and a plurality of peripheral I/O devices, the multiple DMA channel device comprising:
    a plurality of DMA channels, coupled to the system memory over a host data bus;
    a plurality of pre-fetch buffers, each of which is directly coupled to a respective dedicated one of the DMA channels; and
    a plurality of peripheral I/O device controllers, each of which is directly coupled to one of the pre-fetch buffers and one of the DMA channels, and for coupling with one of the peripheral I/O devices, by dedicated connection between the pre-fetch buffers and the peripheral I/O device controllers.

11. A computer system, comprising:
    a central processing unit;
    a memory controller;
    a system memory connected to the central process unit via the memory controller;
    a PCI bus connected to the memory controller;
    a multiplexer connected to the PCI bus;
    a plurality of pre-fetch buffers, each directly connected to the multiplexer;
    a plurality of DMA channels, each directly connected to a respective dedicated one of the pre-fetch buffers; and
    a plurality of peripheral I/O device controllers, each directly connected to one of the pre-fetch buffers and the respective one of the DMA channels, respectively, by dedicated connection between the peripheral I/O device controllers and the pre-fetch buffers, and by dedicated connection between the peripheral I/O device controllers and the DMA channels.

* * * * *